United States Patent [19]

Aoki

[11] Patent Number: 5,745,815
[45] Date of Patent: Apr. 28, 1998

[54] CAMERA COVER

[75] Inventor: Nobuhiro Aoki, Omiya, Japan

[73] Assignee: Fuji Photo Optical Co., Ltd., Omiya, Japan

[21] Appl. No.: 672,921

[22] Filed: Jun. 28, 1996

[30] Foreign Application Priority Data

Jun. 28, 1995 [JP] Japan .................... 7-162089

[51] Int. Cl.$^6$ .................... G03B 15/03; G03B 17/02
[52] U.S. Cl. .................... 396/541; 396/177; 396/178
[58] Field of Search .................... 396/535, 541, 396/175–178

[56] References Cited

U.S. PATENT DOCUMENTS

| | | | |
|---|---|---|---|
| 3,474,714 | 10/1969 | Bihlmaier et al. | 396/541 |
| 4,110,770 | 8/1978 | Lange | 396/541 |
| 5,016,034 | 5/1991 | Goto | 396/541 |
| 5,276,474 | 1/1994 | Dassero | 396/178 |
| 5,463,437 | 10/1995 | Takami | 396/177 |
| 5,489,956 | 2/1996 | Ikeno | 396/176 |

*Primary Examiner*—Safet Metjahic
*Assistant Examiner*—Michael Dalakis
*Attorney, Agent, or Firm*—Sixbey, Friedman, Leedom & Ferguson; David S. Safran

[57] ABSTRACT

An opening is formed in an upper cover so as to be positioned above a printed circuit board when the upper cover is attached to a camera's main body. In order to connect the contacts of the printed circuit board and the lead wires, the upper cover is attached to the camera's main body, and the opening in the upper cover is used for connection. The lead wires are connected to the contacts of the printed circuit board in the opening.

7 Claims, 5 Drawing Sheets

CAMERA COVER

BACKGROUND OF THE INVENTION

1. Field of the Invention

The present invention relates to a camera cover, and more particularly to a camera cover for connecting contacts of a printed circuit board in the camera's main body and lead wires of electrical parts provided in a camera cover.

2. Description of the Related Art

In the case that the electrical parts such as a strobe flash part, etc. are provided in a camera upper cover attached to a camera's main body, lead wires at a strobe flash part need to be connected to contacts of a printed circuit board fixed at the camera body, when the camera upper cover is attached to the camera's main body. Conventionally, the lead wires are first connected to the contacts of the printed circuit board fixed at the camera's main body, and then the upper cover is attached to the camera main body.

However, in the conventional method of connecting lead wires, the lead wires are connected to the printed circuit board before the upper cover is attached to the camera's main body, and the lead wires need to be long. As a result, in the conventional method, the lead wire storage space between the upper cover and the camera's main body, which is formed when the upper cover is attached to the camera main body, should be large. Therefore, there is a disadvantage in that the camera is large in size.

SUMMARY OF THE INVENTION

The present invention has been developed in view of the above-described circumstances, and has its object the provision of a camera cover, which makes it possible to connect electrical contacts of a camera's main body to lead wires of a camera cover with no need for long lead wires so that the camera can be compact.

In order to achieve the above-described object, in a camera cover for connecting electrical contacts of a camera's main body to lead wires of a camera cover attached to the camera's main body; an opening is formed at a part in the camera cover, which is a position corresponding to the electrical contacts of the camera's main body, and the opening is used for connecting the electrical contacts and the lead wires.

According to the present invention; after the camera cover is attached to the camera's main body, the opening, which is formed in the camera cover, is used for connection, and the electrical contacts of the camera's main body is connected to the lead wires of the camera cover in this opening. As a result, in the present invention, the lead wires can be connected to the electrical contacts without long lead wires, and the storage space for lead wires can be minimized. Therefore, the camera can be compact. Moreover, when the connection is completed, the opening is covered by a lid member, so as to prevent the dust, etc. from getting into the camera's main body through the opening.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
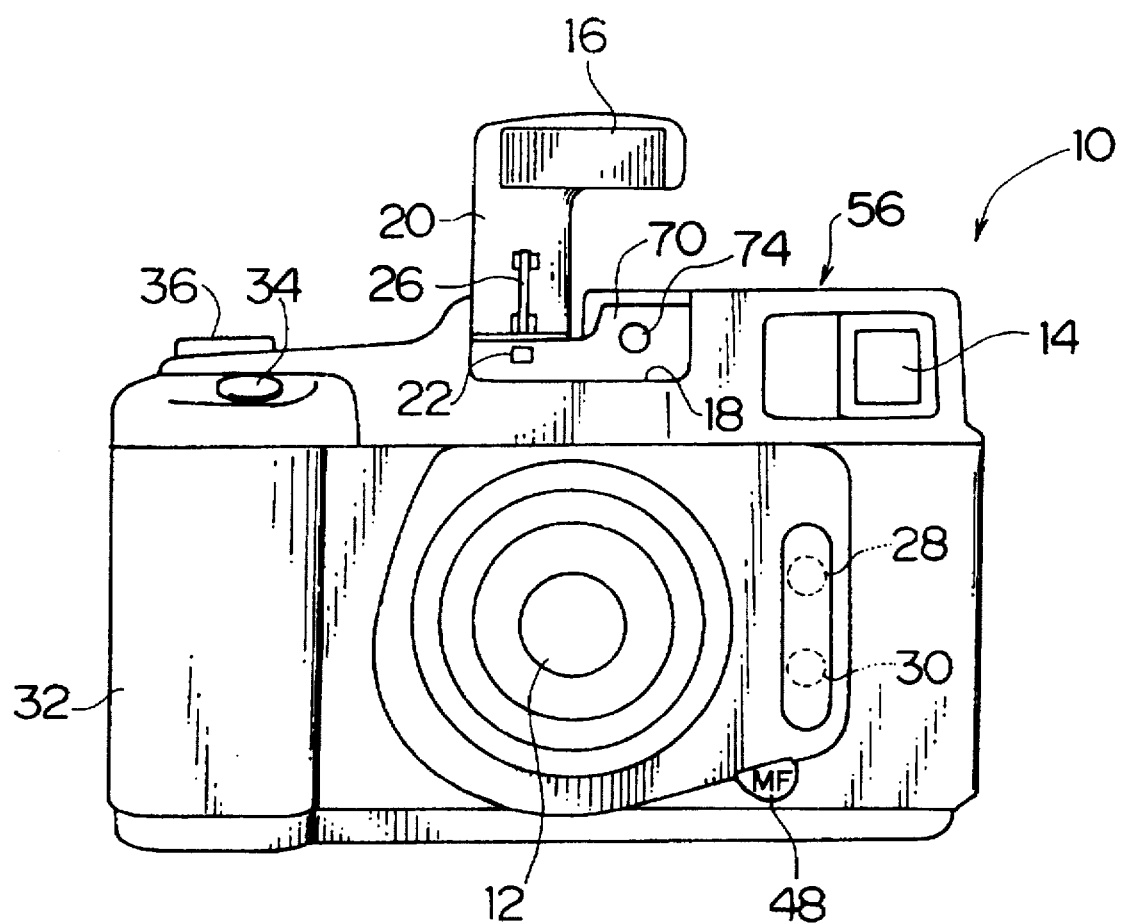
FIG. 1 is a front view illustrating a camera to which a camera cover according to the present invention is applied.

FIG. 1 is a front view illustrating an embodiment of a camera to which a camera cover according to the present invention is applied.

Figure 3:
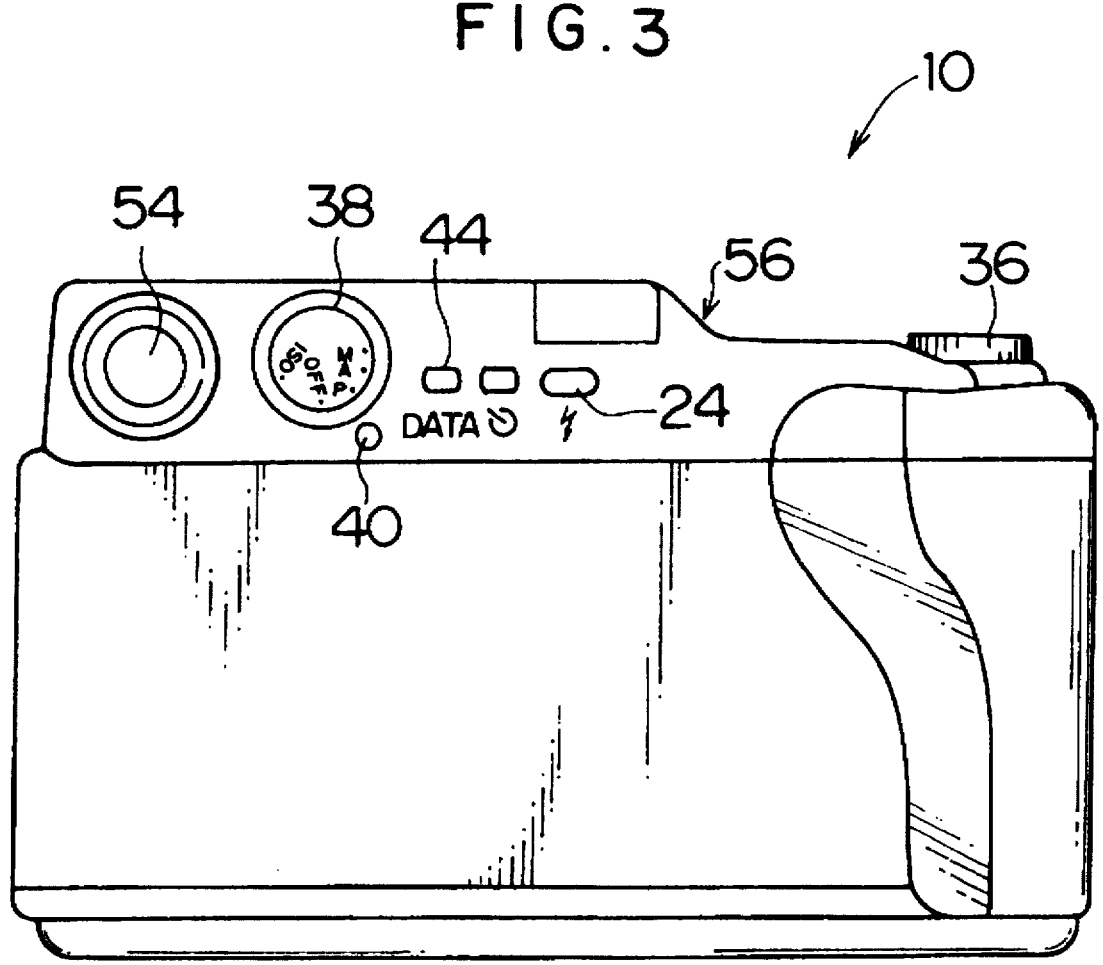
FIG. 3 is an rear view illustrating the back surface of the camera in FIG. 1.

A camera in FIG. 1 is an auto-focus camera. A taking lens 12 is arranged at a substantially central part on a front surface of a camera's main body 10. An illuminated finder 14 is arranged at the top right corner with regard to the taking lens 12 as shown in the drawing. A strobe flash part 16 is arranged above the taking lens 12. The strobe flash part 16 is attached at a concave portion 18, which is formed on the top of an upper cover 56 attached to the main body 10. The strobe flash part can be projected from and stored in the concave portion 18. When the strobe flash part 16 is stored in the concave portion 18, an engagement groove (not shown), which is formed at the arm 20 of the strobe flash part 16, is engaged with a nail 22 projecting from the concave portion 18, so that the strobe flash part 16 can be kept in a state of being stored in the concave portion 18. A lock release button 24, which is provided at the back of the upper cover in FIG. 3, is depressed so that the engagement can be released. As a result, the strobe flash part 16 projects from the concave portion 18 because of a bias pressure applied by a spring member (not shown), and is held at a position as shown in FIG. 1. The rigidity of the arm 20 projecting from the concave portion 18 is improved by a link mechanism 26, which is provided in the upper cover 56.

An AF light projecting part 28 and an AF light accepting part 30 are arranged close to each other on the right side of the taking lens 12 in FIG. 1. Moreover, a grip portion 32 is formed on the right side of a camera's main body 10 in FIG. 1, and a shutter button 34 is provided at the top of the grip portion 32.

Figure 2:
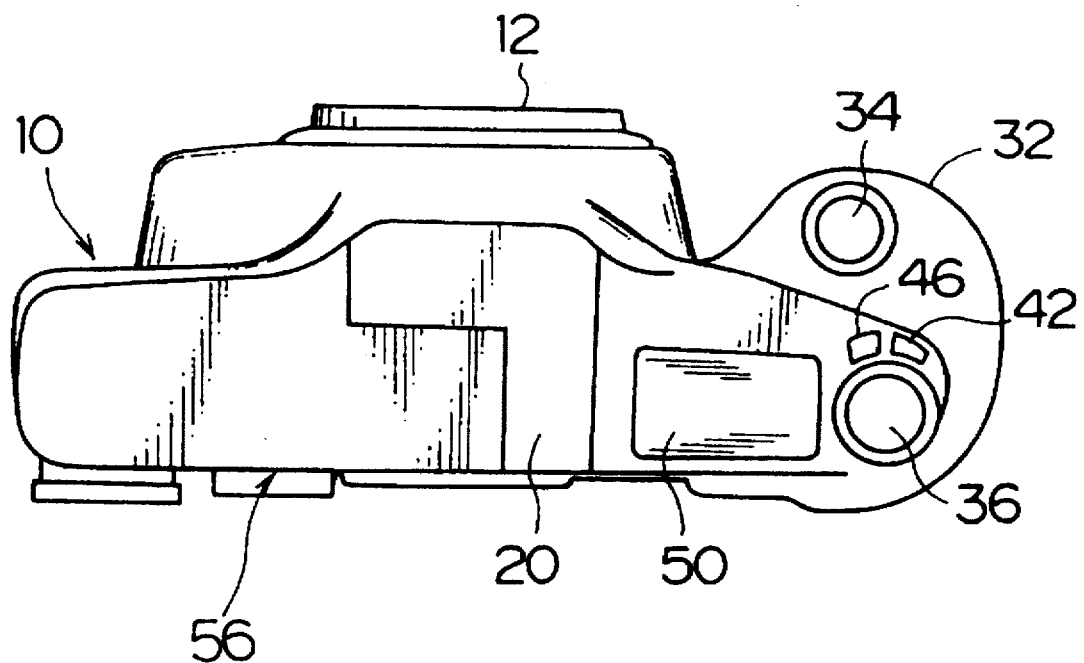
FIG. 2 is a plane view illustrating the top surface of the camera in FIG. 1.

An UP/DOWN dial 36 is arranged close to the shutter button 34 as shown in FIG. 2. The UP/DOWN dial 36 is rotated for selecting a desired value in a mode, which is selected by a select dial 38 at the back of the upper cover 56 in FIG. 3. A select dial lock button 40 is depressed so that the lock of the select dial 38 can be released. As a result, the rotational operation can be performed, and one of the modes "M", "A", "P", "OFF", and "ISO" is selected. For example, when the mode "M" is selected by the select dial 38 and the UP/DOWN dial 36 is rotated, a stop value and a shutter speed can be selected. When the mode "A" is selected by the select dial 38, a stop value can be selected.

Moreover, when the UP/DOWN dial 36 is rotated while an exposure correction button 42 is being depressed after the mode "P" is selected by the select dial 38, an exposure value can be changed. When the UP/DOWN dial 36 is rotated while a "da ta" button 44 (see FIG. 3) is being depressed, the date can be changed. When the UP/DOWN dial 36 is rotated while an "MF" button 48 (see FIG. 1) is being depressed after the AF button 46 is depressed so that the mode can be changed over to the MF mode, a focal length can be set.

When the mode "ISO" is selected by the select dial 38 and the UP/DOWN dial 36 is rotated, an ISO range can be selected. Values in each mode, which are selected in the above-mentioned manner, are displayed on an LCD panel 50, which is arranged close to the select dial 36. When "OFF" is selected by the select dial 36, a main power source of the camera is turned off. A number 54 indicates an eyepiece of the finder 14.

Figure 4:
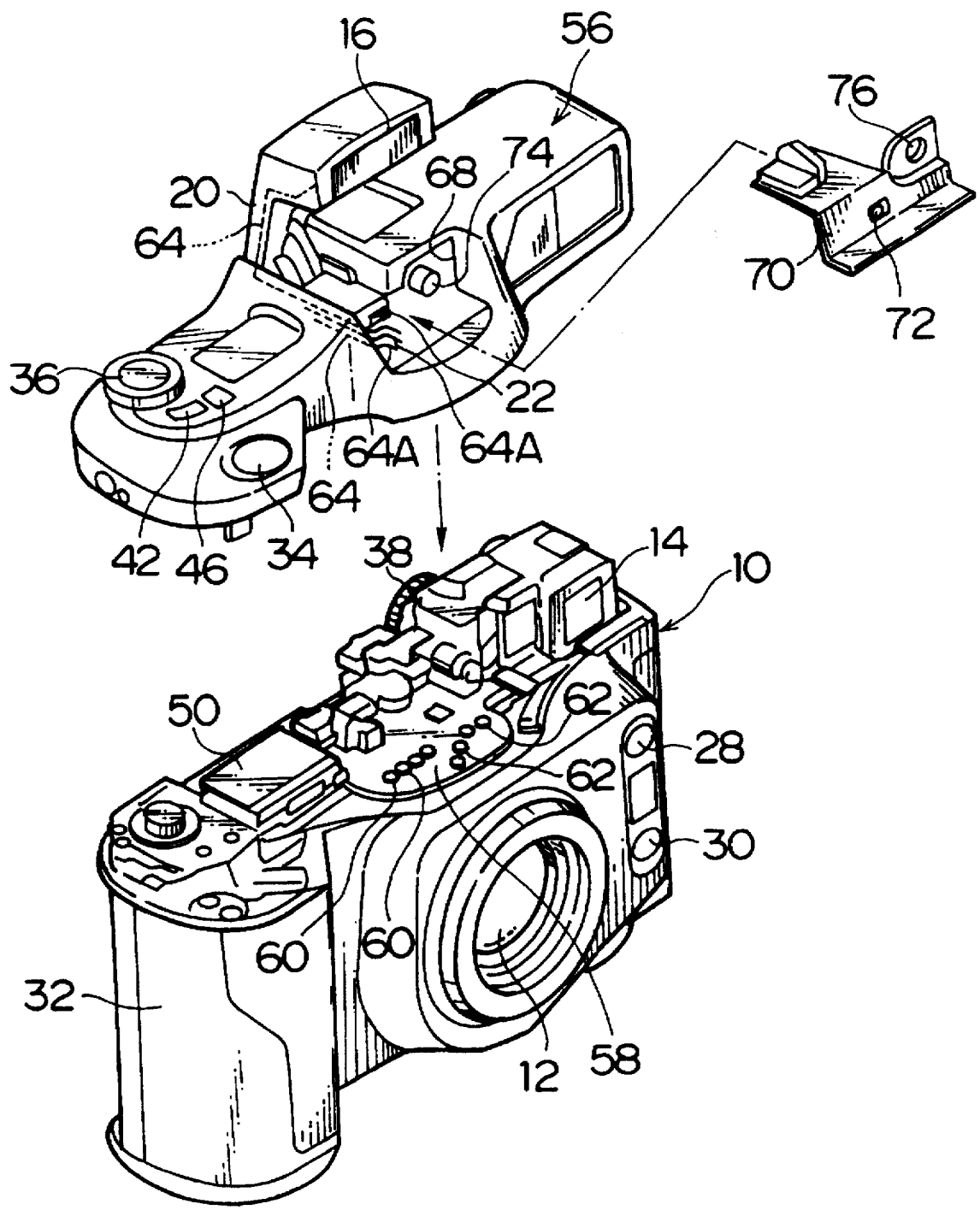
FIG. 4 is a perspective assembly view illustrating a camera's main body and an upper cover.

FIG. 4 is a perspective view illustrating the camera's main body 10 and the upper cover 56.

Figure 5:
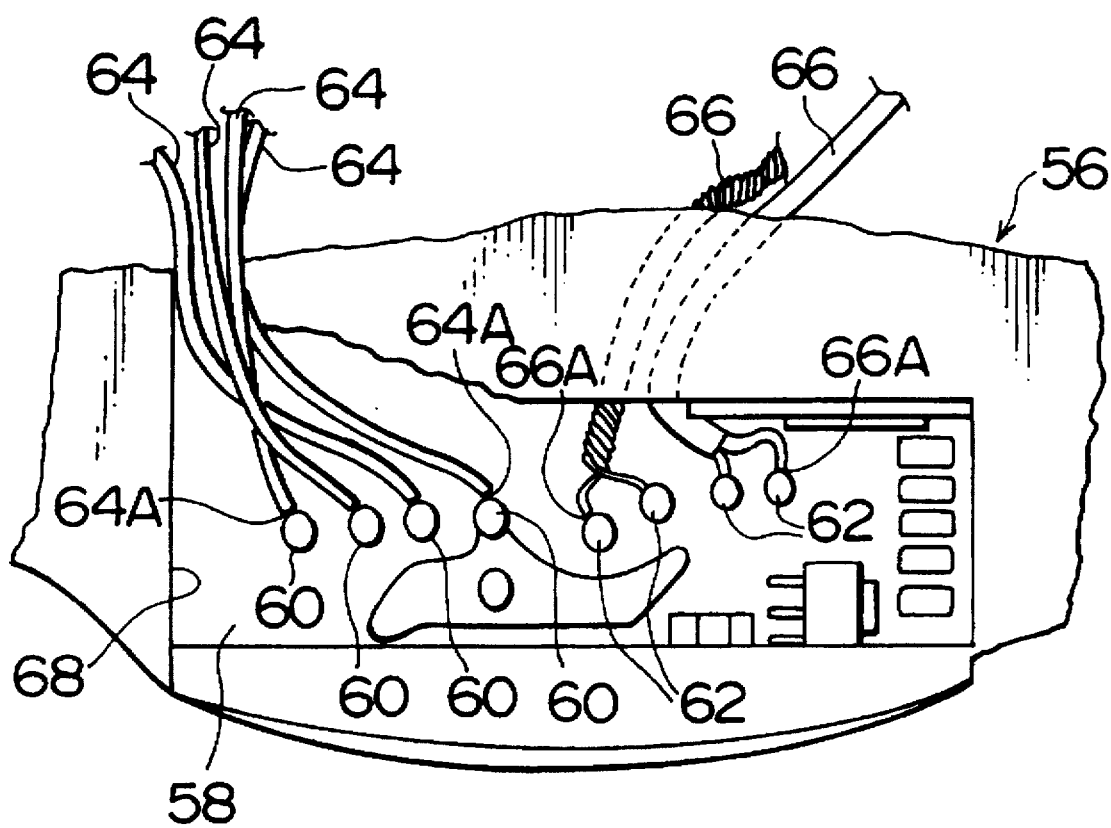
FIG. 5 is a plane view illustrating an embodiment of lead wires and a printed circuit board, which are connected to each other in an opening.

As shown in FIG. 4, a printed circuit board 58 is fixed to a substantially central part at the top of the camera's main body 10. A plurality of contacts 60, 60 ···, 62, 62 ··· are formed on the printed circuit board 58. The contacts 60, 60 ···, connect to a plurality of lead wires 64, 64 ···, which connect to the strobe flash part 16. The contacts 62, 62 ··· connect to a plurality of lead wires 66, 66 ··· (see FIG. 5) of electrical parts such as the AE light accepting part, etc. which are arranged in the finder 14. How to connect the contacts and the lead wires will be described later.

On the other hand, an opening 68 is formed at the concave portion 18 in the upper cover 56 as shown in FIG. 4. The opening 68 is formed in such a manner to be positioned above the printed circuit board 58 when the upper cover 56 is attached to the camera's main body 10. A plurality of the lead wires 64, 64 ··· are arranged in the upper cover via the arm 20. Connecting portions 64A, 64A ··· at forward ends of the lead wires are arranged toward the opening 68. As to a plurality of the lead wires 66, 66 ··· in FIG. 6, connecting portions 66A, 66A ··· at their forward ends are arranged toward the opening 68.

A lid 70 for sheltering the opening 68 is attached to the opening 68. A window 72, which projects the nail 22 in FIG. 1 to the outside of the lid 70, and a window 76, which exposes a light intake part 74 of the strobe flash part 16 to the outside of the lid 70, are formed in the lid 70.

Next, an explanation will be given about how to connect the contacts of the printed circuit board and the lead wires in the camera which is constructed in the above-mentioned manner.

First, before the upper cover 56 is attached to the camera's main body 10, the connecting portions 64A, 64A ··· of the lead wires 64, 64 ··· are positioned at the opening 68. The connecting portions 66A, 66A ··· of the lead wires 66, 66 ··· are positioned at the opening 68.

Next, the upper cover 56 is attached to the camera's main body 10. The opening 68 formed in the upper cover 56 is used as a space for the connecting operation. In the opening 68, the connecting portions 64A, 64A ··· of the lead wires 64, 64 ··· are connected to the contacts 60, 60 ··· of the printed circuit board 58. Then, the connecting portions 66A, 66A ··· of the lead wires 66, 66 ··· are connected to the contacts 62, 62 ··· of the printed circuit board 58. After the connecting operation is completed, the lid 70 is attached to the opening 68, so that the opening 68 can be covered.

As has been described above, in this embodiment, the opening 68 is formed at a part in the upper cover, that is, a position corresponding to a position of the printed circuit board. The opening 68 is used as a space for the connecting operation, so that the lead wires can be connected to the printed circuit board. Therefore, the conventional long lead wires are not required.

Thus, since the lead wires of a minimum length can be connected to the contacts of the printed circuit board in this embodiment, the lead wire storage space between the camera's main body and the upper cover can be minimized. Therefore, if the camera cover in this embodiment is applied, the camera can be compact.

Furthermore, in this embodiment, when the connection is completed, the opening 68 is covered by the lid 70. As a result, dust and other matter can be prevented from getting into the camera's main body 10 through the opening 68.

In this embodiment, the opening 68, which is formed in the upper cover 56, is used for connection. However, the position of the opening 68 is not limited to the upper cover 56. The opening may be formed at a position corresponding to the connecting position of the camera's main body 10.

Furthermore, in this embodiment, the explanation was given about the connection of the lead wire 64 of the strobe flash part 16 and the lead wire 66 of the electrical parts such as the AE light accepting part, etc . . . However, the present invention may also be applied to the connection of the lead wires of the other electrical parts provided in the upper cover 56.

As has been described above, according to the camera cover of the present invention, an opening is formed at a part in the camera cover, that is, a position corresponding to a position of the printed circuit board. The opening is used as a space for connecting the lead wires and the contacts of the printed circuit board. Therefore, the lead wires can be connected to the contacts of the printed circuit board without the long lead wires. As a result, in the present invention, the lead wire storage space can be minimized, so that the camera can be compact.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A camera comprising:

a main body having electrical contacts on a surface thereof;

a camera cover having electrical parts with lead wires therein, said camera cover being attached over said surface of the main body and the electrical contacts thereof;

an opening formed in a portion of said cover at a position which corresponds to that of said electrical contacts and which provides access to the contacts for connecting of said lead wires to said contacts even with the cover being attached over said surface of the main body and the electrical contacts thereof;

and a lid member mountable in said opening for preventing foreign matter from entering the main body via said opening.

2. The camera cover according to claim 1, wherein:

the camera cover is an upper cover attached to a top of the camera's main body; and a strobe flash part and an AE light accepting part, which are the electrical parts, are provided in the upper cover.

3. The camera cover according to claim 2, wherein:

the strobe flash part is attached to a concave portion formed in the upper cover via an arm member in such a manner to project and retract freely; and an opening used for connection is formed at the concave portion in the upper cover.

4. The camera cover according to claim 3, wherein the strobe flash part is stored in the concave portion.

5. The camera cover according to claim 4, wherein the lid member is provided with a window for a light intake part of the strobe flash part.

6. A camera according to claim 1, wherein said camera cover is cap-shaped having a concave portion facing toward said surface of the main body and in which said opening is located.

7. A camera according to claim 6, wherein said electrical contacts are on an upper surface of the main body.

* * * * *